United States Patent [19]

Ogasawara et al.

[11] Patent Number: 4,616,531

[45] Date of Patent: Oct. 14, 1986

[54] HYDRAULIC AND ELECTRONIC CONTROL SYSTEM FOR AN AUTOMATIC TRANSMISSION

[75] Inventors: Tsunehiko Ogasawara, Kariya; Yoshichika Arakawa, Nagoya; Koji Sumiya, Nishio; Yoshikazu Sakaguchi, Anjo, all of Japan

[73] Assignees: Aisin Seiki Kabushiki Kaisha, Kariya; Aisin Warner Kabushiki Kaisha, Aichi, both of Japan

[21] Appl. No.: 589,476

[22] Filed: Mar. 14, 1984

[30] Foreign Application Priority Data

Mar. 31, 1983 [JP] Japan .................................. 58-56444

[51] Int. Cl.⁴ .............................................. B60K 41/18
[52] U.S. Cl. .......................................... 74/866; 74/867
[58] Field of Search ................ 74/866, 867, 865, 868, 74/752 A

[56] References Cited

U.S. PATENT DOCUMENTS 3,738,182  6/1973  Kubo et al. ................. 74/752 A X
3,938,409  2/1976  Uozumi ....................... 74/752 A X
4,346,626  8/1982  Kawamoto ........................... 74/866

*Primary Examiner*—Kenneth J. Dorner
*Assistant Examiner*—Dirk Wright
*Attorney, Agent, or Firm*—Burns, Doane, Swecker & Mathis

[57] ABSTRACT

A control system for an automatic transmission equipped with a plurality of friction engaging devices for attaining a plurality of shift ranges by locking the elements of a gear mechanism, which is disposed between an input shaft and an output shaft, to a case, by bringing the elements into and out of engagement with the input shaft or output shaft, or into and out of engagement with each other, said friction engaging devices including a first friction engaging device (C2) which takes part in achieving a reverse shift, and a second friction engaging device (B2) which participates in achieving parking and reverse the control system includes an electronic control circuit means which controls the timing of the actuation of the first and second friction engaging devices upon shifting from parking to reverse range so as to mitigating shock upon gear shifting.

18 Claims, 6 Drawing Figures

HYDRAULIC AND ELECTRONIC CONTROL SYSTEM FOR AN AUTOMATIC TRANSMISSION

FIELD OF THE INVENTION

This invention relates to an automatic transmission control system and, more particularly, to an automatic transmission control system so adapted as to enable smooth manual shifting from a parking range to a reverse range.

BACKGROUND OF THE INVENTION

The conventional automatic transmission has at least a number of forward shift ranges, as well as a parking range and a reverse range selected by a manual shift. A typical transmission of this type is an automatic transmission equipped with a plurality of friction engaging devices for attaining a plurality of shift ranges by locking the elements of a gear mechanism, which is disposed between an input shaft and an output shaft, to a case, or by bringing the elements into and out of engagement with the input shaft or output shaft, or into and out of engagement with each other, wherein these friction engaging devices include a clutch (C2) serving as one friction engaging device which takes part in achieving a reverse shift, and a brake (B2) serving as another friction engaging device which participates in achieving parking and reverse. In the automatic transmissions, a one-way clutch (F1) generally is provided for fixing one element of a gear mechanism, which is for the purpose of achieving a low-speed range, to, e.g., the case in order to effect smooth shifting from a low-speed range (e.g., first speed) to a high-speed range (e.g., second speed). The other (separate) friction engaging device (B2) is provided for causing this element of the gear transmission to participate in the reverse shift and for locking the element to the case. Where such arrangement is adopted, the output shaft is locked in a violent manner when parking is achieved while the vehicle is moving forward (in the low speed range). As a result, owing to, e.g., the inertia of a rotary body (the element of the gear mechanism), the one-way clutch is subjected to an excessive load. Therefore, to prevent this from occurring, the said other friction engaging device (B2) is often made to participate replacing the one way clutch F1, when parking is achieved.

The following is a typical example of an automatic transmission of the type aforementioned. Specifically, the transmission includes first and second planetary gear sets. The input shaft is connected to a ring gear of the first planetary gear set through a forward clutch C1, and to sun gears of the first and second planetary gear sets through a direct and reverse clutch C2. The output shaft is connected to a carrier of the first planetary gear set, and to a ring gear of the second planetary gear set. The sun gears are braked freely by a second brake B1, and the carrier of the second planetary gear is braked freely by a one-way clutch F1 and a parking and reverse brake B2.

In an automatic transmission of this kind, the clutches and brakes are selectively engaged and disengaged by hydraulic pressure to provide various shift ranges. For example, the brake B2 is engaged for parking, and both the clutch C2 and brake B2 are engaged for reverse. The torques when the clutch C2 and Brake B2 are engaged for reverse are, e.g., 1.0 and 3.5 times the input torque, respectively.

Accordingly, there is a large shock at the time of engagement if solely the clutch C2 is merely cummulatively engaged by shifting from parking to reverse.

SUMMARY OF THE DISCLOSURE

It is therefore an object of the present invention to mitigate this engagement shock produced when shifting from parking to reverse.

Other objects will become apparent in the entire disclosure.

In one aspect of the present invention, the automatic transmission control system of the present invention is characterized in that, in an automatic transmission control system of the above-described type, there are provided:

sensing means for sensing shift position;

means for discriminating, based on a signal from said sensing means, a shift from the parking position to the reverse position; and electronic control circuit means for controlling valves of a hydraulic circuit in such a manner that, when the shifting operation is discriminated to have taken place, said first friction engaging device (C2) is engaged and said second friction engaging device (B2) is temporarily disengaged, followed by re-engaging said second friction engaging device (B2) upon passage of a predetermined length of time.

In another aspect of the present invention the automatic transmission control system is characterized in that in an automatic transmission wherein the foregoing arrangement further includes:

a separate (second) clutch (C1) which participates in achieving a first speed, and a separate (second) brake (B1) which participates in achieving a second speed, and a hydraulic circuit, for controlling said clutches (C1, C2) and brakes (B1, B2), the hydraulic circuit comprising:

a 1-2 shift valve for achieving the first speed by engaging said second clutch (C1) and said second brake (B2), and for achieving the second speed by engaging said second clutch (C1) and second brake (B1), and servo mechanisms each for actuating the first clutch (C2) and the second brake (B1) wherein an exhaust chamber in the servo mechanism of the second brake (B1) is connected to an actuating chamber in the servo mechanism of the first clutch (C2).

The discriminating means and electronic control circuit means can be constructed from a microcomputer, and the valve controlled by the electronic control circuit means can be constituted by a 1-2 shift valve for switching between first and second speeds, by way of example.

In the foregoing construction, hydraulic pressure is introduced into the servo mechanism of the clutch C2 when a manual shift valve operatively associated with a shift lever is moved from the parking position to the reverse position. At the same time, a signal is sent from the sensing means to the discriminating means so that the shift to the reverse position may be discriminated. When this occurs, the control circuit means generates, for a prescribed period of time, a signal for switching the 1-2 shift valve. In consequence, the hydraulic pressure acting upon the brake B2 is released, so that the brake B2 is disengaged for a prescribed period of time before being re-engaged. In addition, it is possible to interconnect the exhaust chamber of the servo mechanism of the brake B1 and the servo mechanism of the clutch C2, in which case hydraulic pressure is introduced into the servo mechanism of the brake B1, and from the said exhaust chamber into the servo mechanism of the clutch C2, at the same time that the 1-2 shift valve is switched over, i.e., at the same time that B2 is disengaged. Therefore, C2 is engaged at an early stage together with the introduction of line pressure by movement of the manual shift valve.

Thus, according to the present invention, when shifting from parking to reverse, at first, the clutch C2 is engaged, followed by engagement of the brake B2 upon passage of a suitable period of time. As a result, torque transfer takes place smoothly and engagement shock at the time of the shift is mitigated.

DETAILED DESCRIPTION OF THE PREFERRED EMBODIMENTS

An embodiment of the present invention will now be described with reference to the accompanying drawings which, however, serve to a better understanding of the invention but are not presented for limitative purpose. Modifications apparent in the art may be made without departing from the gist of the invention.

Figure 1:
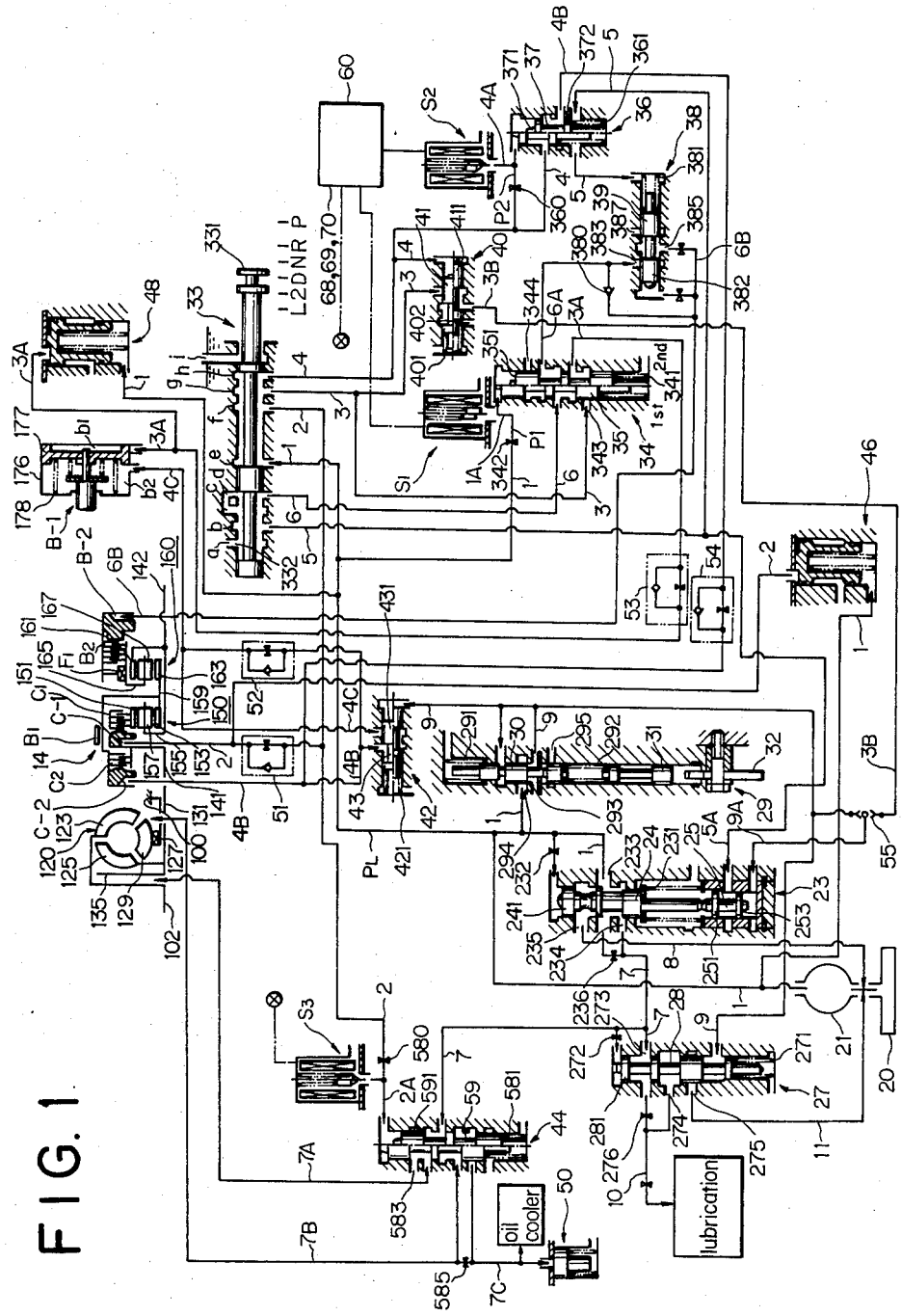
FIG. 1 is a hydraulic circuit diagram of an automatic transmission and the control system thereof.

A vehicle automatic transmission shown at the upper central part of FIG. 1 comprises mainly a torque converter 120 and a planetary gear transmission mechanism 140.

The torque converter 120 comprises a pump impeller 123 of ordinary construction connected to an engine output shaft 102, a turbine runner 125 connected to an output shaft 131, and a stator 129 supported on a case 100 through a one-way clutch 127. Also provided is a lock-up mechanism 135 directly connecting the input and output shafts 102, 131.

The planetary gear transmission 140 is equipped with first and second planetary gear sets 150, 160 between an input shaft 141 integral with the torque converter output shaft 131, and an output shaft 142 disposed in series with the input shaft 141, a multi-disc clutch C1 actuated by a hydraulic servo C-1, a band brake B1 actuated by a hydraulic servo B-1, a multi-disc brake B2 actuated by a hydraulic servo B-2, and a one-way clutch F1.

The first planetary gear set 150 has a ring gear 151 to which the clutch C1 is connected through the input shaft 141, a carrier 155 splined on the output shaft 142, as well as a sun gear 153 and planetary gear 157 connected to the input shaft 141 through the clutch C2 and the band brake B1.

The second planetary gear set 160 comprises a ring gear 161 splined on the output shaft 142, a brake B2, a carrier 165 secured to the automatic transmission case 100 through the one-way clutch F1 in parallel with the brake B2, a sun gear 163 connected to the input shaft 141 through the brake B1, and a planetary gear 167. In the illustrated embodiment, the sun gear 153 of the first planetary gear set 150 and the sun gear 163 of the second planetary gear set 160 are provided on a unitary sun gear shaft 159. The band brake B1 is engaged and disengaged by the hydraulic servo B-1 secured to the case 100. The hydraulic servo B-1 comprises a hydraulic cylinder 176, a piston 177 fitted into the cylinder 176, and a return spring 178. Owing to the piston 177, the space within the cylinder comprises a hydraulic chamber b1 for engaging the brake B1, and an exhaust chamber b2 for disengaging the brake B1 by displacing the piston backwardly.

The hydraulic control system of this automatic transmission will now be described.

Shown are an oil pump 21, a primary regulator valve 23, a secondary regulator valve 27, a throttle valve 29, a manual valve 33, a 1-2 shift valve 34, a 2-3 shift valve 36, a low coast modulator valve 38, a second range boost valve 40, an orifice control valve 42, a lock-up relay valve 44, a B-1 accumulator 46, a C-1 accumulator 48, a cooler by-pass valve 50, flow rate control mechanisms 51, 52, 53, 54 each comprising a check valve and orifice in parallel, a 1-2 shift valve controlling solenoid valve S1, a 2-3 shift valve controlling solenoid valve S2, a lock-up relay valve controlling solenoid valve S3, and an electronic control unit 60 for controlling the solenoid valves S1 through S3.

Described next will be the construction of each valve as well as the operation of the control system.

Oil pumped up from an oil reservoir (not shown) through an oil strainer 20 is introduced into a hydraulic circuit 1 by the oil pump 21.

The primary regulator valve 23 includes a spool 24 backed by a spring 231 in one direction (downwardly in the drawing), and a regulator plunger 25 disposed in series with the spool 24. The regulator plunger 25 has a large-diameter land 253 which receives the throttle pressure of an oil line 9, described below, or the second range boost pressure of a hydraulic line 3B, described below, from an oil line 9A communicated with the oil line 9 and oil line 3B via a three-way check valve 55, and a small-diameter land 251 which receives line pressure, described below, from an oil line 5. The spool 24 is pushed upwardly in the drawing in accordance with these input hydraulic pressures (line pressure and throttle pressure). The spool 24 receives feedback of output hydraulic pressure (line pressure) applied from above to an upper land 241 through an orifice 232, as well as the load applied by the spring 231 and the pushing force applied by the regulator plunger 25, these being applied from below. In response, the spool 24 is displaced to regulate the opening areas of a port 233 communicating with the oil line 1, an out port 234 communicating with an oil line 7, and a drain port 235. The hydraulic pressure of the oil line 1 is regulated in accordance with the oil pump discharge pressure and input hydraulic pressure and, hence, is converted into line pressure. In addition, surplus oil is supplied into the oil line 7, and further excess oil is discharged into the oil strainer 20 from an oil line 8. Thus, line pressure is generated in the oil line 1, which line pressure is regulated in accordance with the vehicle running conditions such as vehicle speed and throttle opening. It should be noted that the oil line 1 and oil line 7 are communicated also by an orifice 236, so that the minimum necessary amount of oil is supplied to the oil line 7 irrespective of the position of the spool 24.

The secondary regulator valve 27 includes a spool 28 backed by a spring 271 in one direction (downwardly in the drawing). The spool 28 receives, from one direction, the load applied by the spring 271 and the throttle pressure applied through an oil line 9, as well as the hydraulic pressure of the oil line 7 applied, from the other direction, to an upper land 281 as feedback through an orifice 272. In response, the spool 27 is displaced to regulate the opening area of a port 273 communicating with the oil line 7, and the opening area of a drain port 275 communicating with an oil line 11, thereby generating a secondary line pressure in the oil line 7, supplying surplus oil as lubricating oil from an oil line 10 to portions requiring lubrication, and discharging further excess oil into the oil strainer 20 from an oil line 11. It should be noted that the lubricating oil supply line 10 is communicated also with the oil line 7 by an orifice 276, so that the minimum necessary amount of lubricating oil is supplied to the oil line 10 irrespective of the position of the spool 28. This prevents the seizing of portions requiring lubrication.

The throttle valve 29 includes a spool 30 backed by a spring 291 in one direction (upwardly in the drawing), a throttle plunger 31 disposed in series with the spool 30 through an intermediate spring 292, a throttle cam 32 for displacing the throttle plunger 31 in accordance with the engine throttle opening, and a stopper plate 293 for limiting the amount of displacement of the spool. The throttle plunger 31 receives feedback of the throttle pressure in the oil line 9, as well as a pushing force applied by the cam 32 coupled to the throttle pedal through a link mechanism (not shown) and rotated by an amount corresponding to the amount by which the pedal is depressed. In response, the throttle plunger 31 is displaced upwardly in the drawing to press the spool 30 through the intermediate spring 292. The spool 30 receives, from above, the spring load of the spring 291 and the throttle pressure feedback of the oil line 9, as well as a pushing force applied from below by the intermediate spring 292. In response, the spool 30 is displaced to regulate the opening area of an in port 294 communicating with the oil line 1, and the opening area of a drain port 295, thereby producing throttle pressure in the oil line 9. The throttle pressure, which is one of the signals related to the output of the prime mover, increases in accordance with an increase in the throttle opening. When a signal hydraulic pressure which increases in accordance with vehicle speed (or the rotating speed of the output shaft 142) is applied to a chamber (a chamber accommodating the spring 291) at the upper end of the throttle valve 29 (as shown in FIG. 1), a throttle hydraulic pressure can be produced which increases in accordance with an increase in the throttle opening, and which decreases in accordance with an increase in vehicle speed (or the rotating speed of the output shaft 142).

The manual valve 33 includes a spool 331 moved manually by a shift lever (not shown) provided at the driver's seat. As shown in Table 1, the oil line 1 generating the line pressure is communicated with the oil lines 2 through 6 in manner depending upon the position at which the shift lever is set (the set range). These positions are P (park), R (reverse), N (neutral), D (drive), 2 (second) and L (low). The oil line 2 is communicated with the hydraulic servo C-1 of the forward clutch C1 through a flow rate control valve 51 and the accumulator 46 provided downstream of the control valve, and supplies control pressure to the lock-up relay valve 44. The oil line 3 supplies line pressure to the 1-2 shift valve 34 and second range shift booster valve 40. The oil line 4 supplies line pressure to the 2-3 shift valve 36 and control pressure to the second range booster valve 40. The oil line 5 supplies control pressure to the 2-3 shift valve 36, the low coast modulator valve 38 and the throttle valve. The oil line 6 supplies line pressure to the 1-2 shift valve 34.

TABLE 1

| | COMMUNICATION WITH LINE PRESSURE | | | | |
| --- | --- | --- | --- | --- | --- |
| | Line 2 | Line 3 | Line 4 | Line 5 | Line 6 |
| P | X | X | X | X | O |
| R | X | X | X | O | O |
| N | X | X | X | X | X |
| D | O | O | O | X | X |
| 2 | O | O | X | X | X |
| L | O | X | X | X | O |

Figure 2:
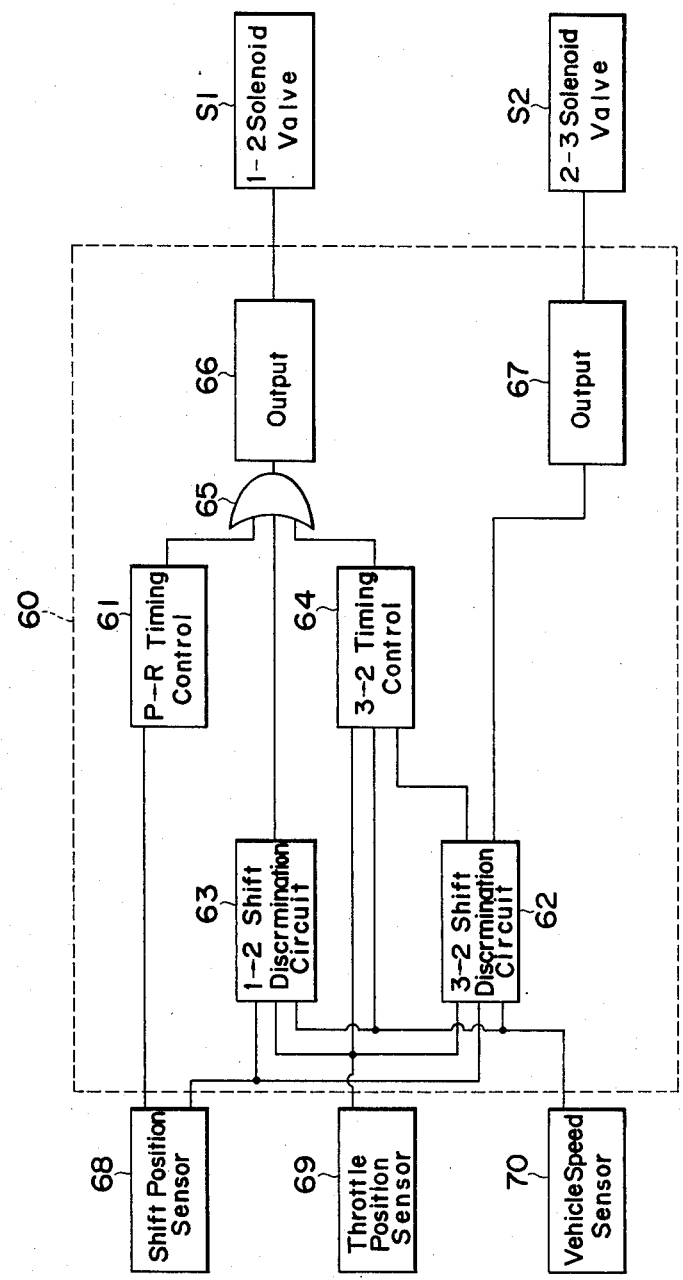
FIG. 2 is a block diagram showing an electronic control unit for the hydraulic circuit of FIG. 1.
Figure 3:
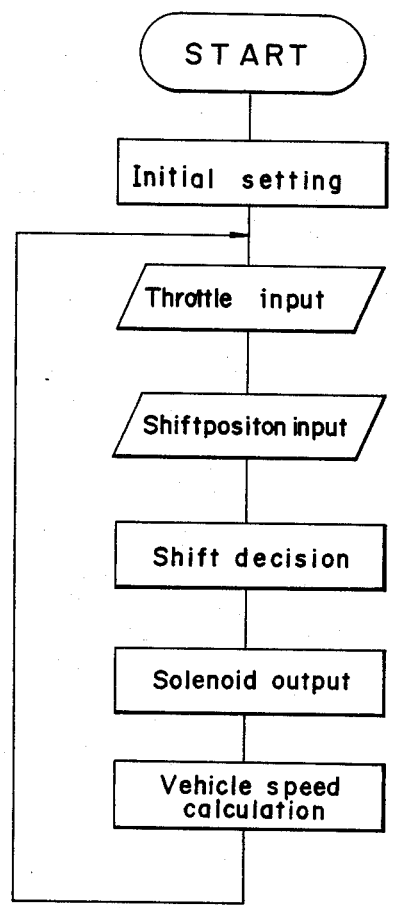
FIGS. 3 and 4 and flowcharts illustrating programs executed by the electronic control unit of FIG. 2.
Figure 4:
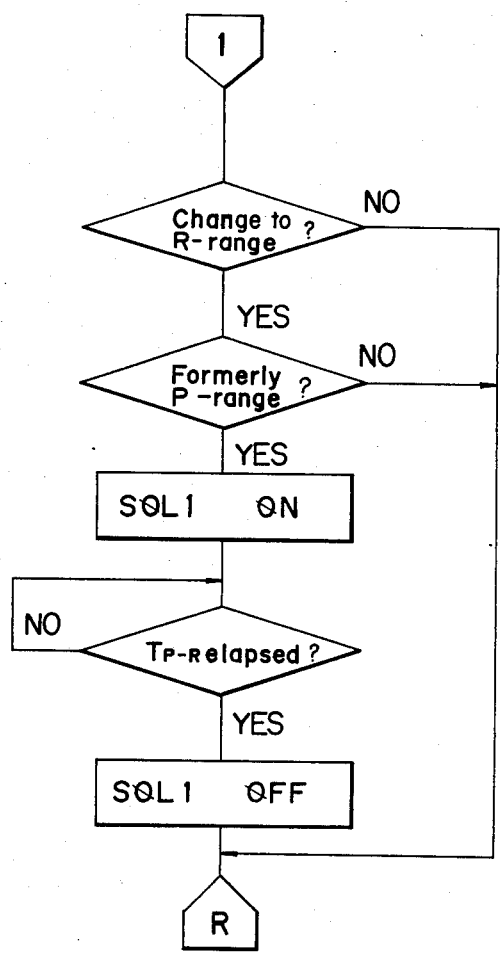

The electronic control unit 60, as shown in FIG. 2, comprises a P→R timing control circuit 61, a 3→2 timing control circuit 64, a 1→2 shift discrimination circuit 63, a 3→2 shift discrimination circuit 62, an OR circuit 65 the input side of which is connected to the output terminals of the timing control circuits 61, 64 and the output terminal of the 1→2 shift discrimination circuit 63, a circuit 66 whose input side is connected to the output terminal of the OR circuit for controlling the first solenoid valve S1, and a circuit 67 whose input side is connected to the output terminal of the 3→2 shift discrimination circuit 62 for controlling the second solenoid valve S2. Connected to input terminals of the 1→2 shift discrimination circuit 63 and 3→2 shift discrimination circuit 62 are a shift position sensor 68, a throttle position sensor 69, and a vehicle speed sensor 70. The shift position sensor 68 is connected to the input terminal of the P→R timing control circuit 61. Connected to the input terminals of the 3→2 timing control circuit 64 are the output terminals of the throttle position sensor 69 and vehicle speed sensor 70 and the output terminal of the 3→2 sift discrimination circuit 62. FIGS. 3 and 4 illustrate the programs executed by the electronic control circuit 60.

The driver, by selectively turning on an automatic transmission switch and a manual transmission switch, causes the vehicle to run in the automatic transmission mode or in a specific shift range, as shown in Table 2 below, with respect to the manual valve setting position, namely D, 2nd and L. Setting the automatic transmission running mode or speed shift range running mode is performed by the electronic control unit 60, which receives inputs from the automatic transmission switch and manual transmission switch. The electronic control circuit 60, in response to these input signals, produces outputs in such a manner that the solenoid valves S1 and S2 are set to the automatic transmission position or specific shift range position, respectively.

TABLE 2

| | Automatic Shifting | Manual Shifting |
| --- | --- | --- |
| D-range | 3rd ⇔ 2nd ⇔ 1st | 3rd |
| 2-range | 2nd ⇔ 1st | 2nd |

TABLE 2-continued

| | Automatic Shifting | Manual Shifting |
|---|---|---|
| L-range | 2nd ⇐⟶ 1st | 1st |

The 1-2 shift valve 34 includes a spool 35 backed by a spring 341 in one direction (downwardly in the drawing). The spool 35 receives, from one direction, the spring load of the spring 341, and has an upper land 351 which receives, from the other direction, the hydraulic pressure P1 of an oil line 1A communicating with the oil line 1 through an orifice 342 and having the electromagnetic solenoid valve S1 attached thereto. In response, the spool 35 is displaced. When the solenoid valve S1 is in the conductive state, the valve opening thereof is opened, pressure is discharged from the oil line 1A, the pressure P1 drops to a low level, and the spool 35 is set to the upward side, namely the 1st speed side, by the action of the spring 341. In consequence, an in port 343 communicating with the oil line 3 is closed, the oil line 6 is communicated with an oil line 3A, which communicates with the hydraulic chamber b1, on the engaging side, provided in the hydraulic servo B-1 of the 2nd speed brake B, and the drain port 344 is communicated with an oil line 6A communicating with the low coast mudulator valve 38. When the manual valve 33 is set to each of the ranges D and N, the oil line 6 is communicated with the drain port 332 of the manual valve, as shown in FIG. 1. Accordingly, no hydraulic pressure is produced in the oil line 3A, and the brake B1 is released. When the solenoid valve S1 is in the non-conductive state, the valve opening thereof is closed, the hydraulic pressure P1 of the oil line A1 assumes a high level equivalent to the line pressure, and the spool 35 is set to the lower side, namely the 2nd speed side. In consequence, the oil line 3 is communicated with the oil line 3A, which communicates with the hydraulic chamber b1, on the engaging side, provided in the hydraulic servo B-1 of the 2nd speed brake B1, and the oil line 6 is communicated with the oil line 6A communicating with the low coast modulator valve 38. Further, the hydraulic chamber b1 of the hydraulic servo B-1 is supplied with line pressure through the flow rate control valve 53 provided in the oil line 3A, and the accumulator 48 provided downstream of the control valve 53. Thus, the brake B1 is engaged.

The 2-3 shift valve 36 includes a spool 37 backed by a spring 361 in one direction (downwardly in the drawing). The spool 37 receives, from one direction, the spring load of the spring 361 and the line pressure of the oil line 5 when this line pressure is produced in the oil line 5, the pressure acting upon a lower land 372, as well as the hydraulic pressure P2 of the oil line 4A, this pressure acting upon an upper land 371 from the other direction. The oil line 4A communicates with the oil line 4 through an orifice 360 and is provided with the electromagnetic solenoid valve S2. The spool 37 is displaced in response to these forces. When the solenoid valve S2 is in the conductive state, the hydraulic pressure P2 of the oil line 4A assumes a low level, as in the case of the 1-2 shift valve. Therefore, the spool 37 is set to the upward side (2nd speed side), so that communication between the oil line 4 and the oil line 4B, which communicates with the clutch C2, is cut off. When the solenoid valve S2 is in the non-conductive state, the spool 37 is set to the lower side (3rd speed side), the oil line 4 is communicated with the oil line 4B, and the line pressure of oil line 4 is communicated to the hydraulic servo C-2 of the clutch C2 through the flow rate control valve 54. Also, the exhaust chamber b2 on the release side of the hydraulic servo B-1 of brake B1 is supplied with line pressure through the flow rate control valve 52. As a result, the clutch C2 is engaged and the brake B1 is released. Further, when line pressure is being produced in the oil line 5 (i.e., when the manual valve is set to the L position), the spool is positioned upwardly (2nd speed side) by the line pressure acting on the lower land 372 and the spring load of the spring 361.

The low coast modulator valve 38 includes a spool 39 is backed by a spring 381 in one direction, and receives, from one direction, the spring load of the spring 381 and the line pressure produced in the oil line 5 and, from the other direction, the output hydraulic pressure feedback acting upon a left land 382. The spool 39 is displaced in response to these forces. The low coast modulator valve 38 has an in port 383 communicating with the oil line 6A, an out port 385 communicating with an oil line 6B, which communicates with the hydraulic servo B-2 of the brake B2, and a drain port 387, and responds to displacement of the spool 39 to regulate the opening area of the in port 383 and drain port 387. Thus, line pressure supplied from the oil line 6A is regulated before being delivered to the oil line 6B. The oil lines 6A, 6B are communicated through the low coast modulator valve 38 and through a check valve 380, with the discharge of oil from the oil line 6B to the oil line 6A proceeding rapidly through the check valve 380.

The 2nd range shift valve 40 includes a spool 41 backed by a spring 401 in one direction. The spool 41 receives, from one direction, the spring load applied by the spring 401, and has a right land 411 which receives the line pressure of the oil line 4 applied from the other direction, the spool 41 being displaced as a result. When the manual valve 33 is at a set position other than the D range and line pressure is not being supplied to the oil line 4, the spool 41 is set to the right side by the action of the spring 401, and the oil line 3 is communicated with the oil line 3B, which communicates via the three-way valve 55 with an input oil line 9A to the plunger 25 of the primary regulator valve 23. As a result, when the driver selects manual shifting, sets the manual valve 33 to 2nd and effects travel in the 2nd speed, the output line pressure of the primary regulator valve is raised in level by the line pressure input from the oil line 5A. In comparison with starting motion in the first speed, the torque capacity of the hydraulic servos C-1 and B-1 of the clutch C1 and brake B1 are increased in accordance with an increase in the transfer torque accompanying start of motion at a low reduction ratio. Hence, starting motion in 2nd speed takes place smoothly. When the manual valve 33 is set to the D range, the oil line 4 is supplied with line pressure, the spool 41 is set to the left side, and the oil line 3B is communicated with the drain port 402 to effect drainage.

As a result of the foregoing, the primary regulator valve 23 has no input of line pressure from the oil line 9A, so that ordinary line pressure (line pressure without a raise in level) is established and an unnecessary increase in torque capacity is prevented at the time of automatic shifting when the manual valve is in the D range. There is also no increase in shock at the time of automatic shifting.

The orifice control valve 42 includes a spool 43 backed by a spring 421 in one direction. The spool 43 receives, from one direction, the spring load applied by the spring 421 and, from the other direction, the throttle pressure of the oil line 9, which is applied to a right land 431, and is displaced by these forces. Thus, communication whether or not via the flow rate control valve 52 is switched between an oil line 4B and an oil line 4C, the latter communicating with the exhaust chamber b2 on the release side of the hydraulic servo of brake B1. (The oil lines 4B and 4C are mutually communicated via the flow rate control valve 52 connected in parallel with the orifice control valve 42.) In other words, when the throttle pressure of the oil line 9 is greater than a set value, the communication between oil line 4B and oil line 4C is cut off and, when the throttle pressure is below the set value, communication is established between the oil line 4B and the oil line 4C.

In the foregoing arrangement, the following reduction ratios are obtained depending on the shift lever positions P, R, N, D, 2 and L in combination with actuation of the solenoids S1, S2, S3, clutches C1, C2, F1, and brakes B1, B2.

|   |     | S1 | S2 | S3 | C1 | C2 | B1 | B2 | F1 |
|---|-----|----|----|----|----|----|----|----|----|
| P |     |    | X  | X  | X  |    |    |    | O  |
| R |     |    | X  | X  | X  |    | O  |    | O  |
| N |     |    | X  | X  | X  |    |    |    |    |
| D | 3rd |    | X  | X  | ⊙  | O  | O  |    |    |
|   | 2nd |    | X  | O  | ⊙  | O  |    | O  |    |
|   | 1st |    | O  | O  | ⊙  | O  |    |    | O  |
| 2 | 2nd |    | X  | X  | ⊙  | O  |    | O  |    |
|   | 1st |    | O  | X  | ⊙  | O  |    |    | O  |
| L | 1st |    | X  | X  | ⊙  | O  |    | O  |    |

In the foregoing, X marks when the solenoid valve is OFF, O marks when the solenoid valve is ON, thereby indicating engagement of the clutch and brake or locking of the one-way clutch, respectively, and ⊙ indicates engagement of a lock up clutch.

Figure 5:
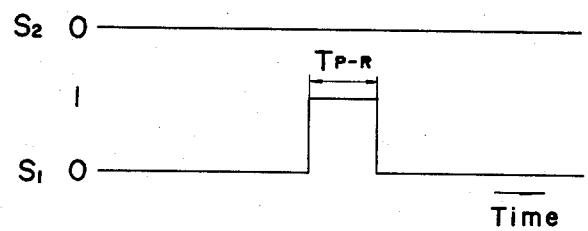
FIG. 5 is a waveform diagram showing a solenoid excitation pulse produced by the electronic control unit of FIG. 2.
Figure 6:
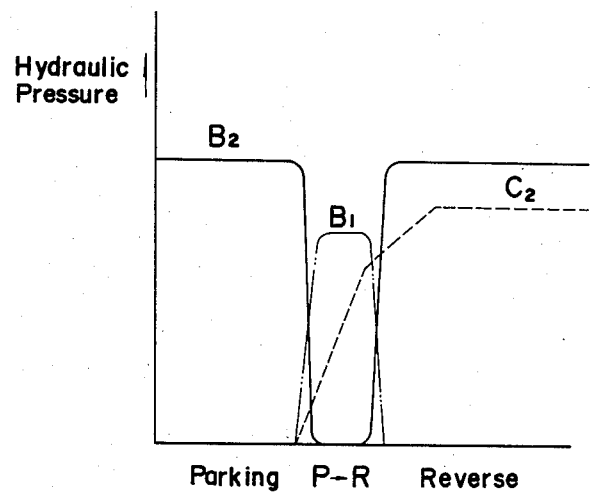
FIG. 6 is a view showing change in hydraulic pressure applied to a servo mechanism.

When the manual shift valve 33 is placed in the P (parking) position by the shift lever (not shown), line pressure $P_L$ is fed from the oil line 1 into the oil line 6 through ports e and f. At this time, the electronic control unit 60 keeps both of the solenoid valves S1, S2 non-conductive (OFF) as shown in FIG. 5. Accordingly, the spool 35 of the 1-2 shift valve 34 is positioned as shown by the right side thereof, so that the line pressure P is applied to the servo mechanism B-2 through the oil lines 6, 6A and 6B to engage the brake B2. At this time, since the spool 37 is positioned as shown by the upper side thereof by the spring force of the 2-3 shift valve 36, the hydraulic pressure within the servo mechanism C-2 of the clutch C2 is discharged through the oil line 4B, 2-3 shift valve 36, oil line 5 and ports b, a of the manual select valve 33. As a result, the clutch C2 is in the disengaged state.

When the manual select valve 33 is switched over to the R (reverse) position at such time, P→R shift is sensed by the shift position sensor 68, and the programs shown in FIGS. 3 and 4 are executed by the circuits 61, 65 and 66. In consequence, the control unit 60 produces an excitation pulse, as shown in FIG. 5, and delivers the pulse to the solenoid valve S1 for the duration t. The solenoid valve S1 therefore is rendered conductive, so that the spool 35 of the 1-2 shift valve 34 assumes the state indicated by the left-hand (upper position) side thereof. At this time, line pressure P is applied from the oil line 1 to the oil lines 6 and 5 through the ports e, d and b of the manual shift valve 33. The line pressure of the oil line 5 urges the spool 37 of the 2-3 shift valve 36 upwardly and is introduced into the servo mechanism C-2 through the oil line 4B. The clutch C2 is engaged as a result. On the other hand, the pressure in the oil line 6 is introduced into the working chamber b1 of the servo mechanism B1 through the 1-2 shift valve 34 and oil line 3A. In cosequence, the pressure on the discharge pressure side is introduced to the servo mechanism C-2 through the valve 52 and line 4B, thereby promoting an increase in the pressure of the servo mechanism C-2. Meanwhile, the hydraulic pressure which until now has been applied to the servo mechanism B-2 is discharged from the oil line 6B, ports 385, 383 of the modulator valve 38, oil line 6A and port 344 of the 1-2 shift valve 34. The brake B2 is released as a result.

Thereafter, following passage of a prescribed period of time, the control unit 60 turns off the solenoid valve S1. As a result, the spool 35 of the 1-2 shift valve 34 is moved downwardly to assume the state shown by the right side thereof, and the line pressure of the oil line 6 is re-introduced into the servo mechanism B-2 through the oil lines 6A, 6B, thereby engaging the brake B2. The clutch C2 and brake B2 thus are both to establish the reverse range of the transmission.

Thus, according to the present invention, the brake B2 having the large engaging torque is engaged last to make possible a smooth P→R shift. In addition, since the clutch C2 is a rotary member, the oil line for supplying the servo mechanism C-2 is formed extending between the oil pump body and the stator shaft to communicate to the C2 drum and is of some length, whereas the oil line leading to the servo mechanism B-2 of the brake B2 is extremely short. This tends to produce a time lag when engaging the clutch C2. However, according to the present invention, the exhaust pressure of the servo mechanism B-1 is introduced into the servo mechanism C-2. The advantageous result is that the clutch C2 can be engaged at an earlier time.

What is claimed is:

1. In an automatic transmission equipped with a plurality of friction engaging devices for attaining a plurality of shift ranges by locking the elements of a gear mechanism, which is disposed between an input shaft and an output shaft, to a case, or by bringing the elements into and out of engagement with the input shaft or output shaft, or into and out of engagement with each other, said friction engaging devices including a first friction engaging device (C2) which takes part in achieving a reverse shift, and a second friction engaging device (B2) which participates in achieving parking and reverse, a control system for said automatic transmission which comprises:
   sensing means for sensing shift position;
   means for discriminating, based on a signal from said sensing means, a shift from the parking position to the reverse position; and
   electronic control circuit means for controlling valves of a hydraulic circuit in such a manner that, when the shifting operation is discriminated to have taken place, said first friction engaging device (C2) is engaged and said second friction engaging device (B2) is temporarily disengaged, followed by re-engaging said second friction engaging device (B2) upon passage of a predetermined length of time.

2. In an automatic transmission equipped with a plurality of friction engaging devices for attaining a plurality of shift ranges by locking the elements of a gear mechanism, which is disposed between an input shaft and an output shaft, to a case, or by bringing the elements into and out of engagement with the input shaft or output shaft, or into and out of engagement with each other, said friction engaging devices including a first clutch (C2) which takes part in achieving a reverse shift, a first brake (B2) which participates in achieving parking and reverse, a second clutch (C1) which participates in achieving a first speed, and a second brake (B1) which participates in achieving a second speed, a control system for said automatic transmission which comprises:

sensing means for sensing shift position;

means for discriminating, based on a signal from said sensing means, a shift from the parking position to the reverse position;

electronic control circuit means for controlling valves of a hydraulic circuit in such a manner that, when the shifting operation is discriminated to have taken place, said clutch (C2) is engaged and said brake (B2) is temporarily disengaged, followed by re-engaging said brake (B2) upon passage of a predetermined length of time, and a hydraulic circuit for controlling said clutches (C1, C2) and brakes (B1, B2), the hydraulic circuit comprising:

a 1–2 shift valve for achieving the first speed by engaging said second clutch (C1) and said second brake (B2), and for achieving the second speed by engaging said second clutch (C1) and said second brake (B1), and servo mechanisms each for actuating the first clutch (C2) and the second brake (B1) wherein an exhaust chamber in the servo mechanism of the second brake (B1) is connected to an actuating chamber in the servo mechanism of the first clutch (C2).

3. The control system for the automatic transmission as defined in claim 1 or 2, wherein the electronic control circuit means includes a parking to reverse timing control means to which the output of the sensing means for sensing shift position is connected and a first output means for generating a pulse to actuate a first solenoid valve for the predetermined length of time in response to the output of the parking to reverse timing control means.

4. The control system for the automatic transmission as defined in claim 3, wherein the first solenoid valve shunts a 1–2 shift valve which participates in switching first and second speed ranges.

5. The control system for the automatic transmission as defined in claim 3, wherein the electronic control circuit further includes a 1 to 2 shift discrimination circuit and a 3 to 2 shift discrimination circuit each connected with the outputs of the shift position sensing means a throttle position sensing means and a vehicle speed sensing means; an OR gate means having an input to which the outputs of the parking to reversing timing control means, the 1 to 2 shift discrimination and the 3 to 2 shift discriminating means and having output connected with the first output means; and a second output means which actuates a second solenoid valve in response to the output from the 3 to 2 shift discrimination circuit.

6. The control system for the automatic transmission as defined in claim 5, wherein the second solenoid valve changes over a 2–3 shift valve which participates in switching second and third speed ranges.

7. The control system as defined in claim 4, wherein the electronic control circuit further includes a 3 to 2 shift timing control means which is interposedly connected between the output of the 3 to 2 shift discrimination circuit and an input of the OR gate means, and which is further connected with the outputs of the throttle position sensing means and the vehicle speed sensing means.

8. The control system for the automatic transmission as defined in claim 2, wherein the parking range is achieved when the first brake B2 is engaged, the reverse range is achieved when the first brake B2 and the first clutch C2 are engaged, forward speed ranges are achieved when the second clutch C1 is engaged, and the second speed range is achieved when the second clutch C1 and the second brake B1 are engaged.

9. The control system as defined in claim 8, wherein the hydraulic circuit further includes an additional clutch (F1) disposed in parallel with the first brake B2, the clutch (F1) achieving the first speed range on its engagement.

10. The control system as defined in claim 8, wherein the hydraulic circuit further includes solenoid valves (S1,S2) each controlling the 1–2 shift valve and the 2–3 shift valve, respectively, whereas the 1–2 shift valve includes:

a spool actuatable in response to the solenoid valve (S1), a first in port communicatable to a hydraulic pressure source at the reverse and parking ranges, and a first out port communicated to the servo (B-2) of the first brake (B2), the first out port being communicatable with the first in port at the reverse and parking ranges, provided that the solenoid valve (S1) is actuated by the electronic control circuit means to achieve the reverse and parking ranges; and whereas the 2–3 shift valve includes: a spool actuatable in response to the solenoid valve (S2), an in port communicatable to the hydraulic pressure source at the reverse range, and an out port communicated to the servo (C-2) of the first clutch (C2), this out port being communicated with said in port at the reverse range; wherein the solenoid valve (S2) is actuated by the electronic control circuit means to achieve the reverse range.

11. The control system as defined in claim 10, wherein upon sensing the reverse position the solenoid valve (S1) is first actuated so as to temporarily cut off the communication between the first in port and the first out port of the 1–2 shift valve for the predetermined length of the time, followed by resuming the unactuated state.

12. The control system as defined in claim 10, wherein the 1–2 shift valve further includes:

a second out port communicating to the servo (B-1) of the second brake (B1), and a second in port (343) communicatable to the hydraulic pressure source, the second in port (343) being communicated to the second out port at the second speed range.

13. The control system as defined in claim 12, wherein the 1–2 shift valve further includes a drain port 344 which communicates with the first out port upon discommunication of the first out port with the first in port so as to exhaust the servo (B-2) of the first brake B2.

14. The control system as defined in claim 2, wherein the hydraulic circuit further includes a flow rate control valve (52) which is disposed between said exhaust chamber in the servo mechanism (B-1) of the second brake (B1) and the actuating chamber in the servo mechanism (C-2) of the first clutch.

15. The control system as defined in claim 1 or 2, wherein the electronic control circuit means includes a micro-computer processed with a program which includes the steps in response to the output of the shift position sensor:
  (a) discriminating change to the reverse range,
  (b) if YES at (a), discriminating whether or not the previous range is the parking range,
  (c) if YES at (b), ordering to actuate the solenoid valve (S1),
  (d) discriminating whether or not the predetermined length of time ($T_{P-R}$) has elapsed,
  (e) if YES at (d) ordering to release the actuation of the solenoid valve (S1), then
  (f) repeating from the step (a), whereas
  (g) if NOT at (d), repeat the step (d), and
  (h) if NOT at (a) or (b), repeating from the step (a).

16. The control system as defined in claim 12, wherein said spool of the 1-2 shift valve is normally biased by a spring, and is actuated by a signal pressure controlled by the solenoid valve (S1), against the spring force, said spool having a land which selectively communicates the first in port with the first out port in accordance with the signal pressure.

17. The control system as defined in claim 16, wherein said spool has another land which selectively communicates the second in port with the second out port.

18. The control system as defined in claim 13, wherein said spool in the 1-2 shift valve has a further land which selectively communicates the first out port with the drain port.

* * * * *